United States Patent
Kuwatsuka

(10) Patent No.: US 6,542,286 B2
(45) Date of Patent: Apr. 1, 2003

(54) WAVELENGTH CONVERTING DEVICE AND CONVERTING METHOD

(75) Inventor: Haruhiko Kuwatsuka, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 151 days.

(21) Appl. No.: 09/759,338

(22) Filed: Jan. 16, 2001

(65) Prior Publication Data

US 2001/0024316 A1 Sep. 27, 2001

(30) Foreign Application Priority Data

Mar. 24, 2000 (JP) .................................. 2000-084762

(51) Int. Cl.[7] .................... G02F 1/365; G02F 2/02; H01S 5/34
(52) U.S. Cl. ........................ 359/332; 372/45
(58) Field of Search ................. 359/326–332; 372/43–50

(56) References Cited

U.S. PATENT DOCUMENTS

| | | | | |
|---|---|---|---|---|
| 4,528,464 A | * | 7/1985 | Chemla et al. | 359/326 |
| 5,754,714 A | * | 5/1998 | Suzuki et al. | 385/131 |
| 6,198,854 B1 | * | 3/2001 | Takagi | 359/332 |
| 6,349,106 B1 | * | 2/2002 | Coldren | 372/26 |
| 2001/0024316 A1 | * | 9/2001 | Kuwatsuka | 359/332 |

FOREIGN PATENT DOCUMENTS

JP 2001-272703 * 10/2001

* cited by examiner

Primary Examiner—John D. Lee
(74) Attorney, Agent, or Firm—Armstrong, Westerman & Hattori, LLP

(57) ABSTRACT

A multi quantum well layer has a lamination of first and second quantum well layers each sandwiched between barrier layers and defining a quantum well. The band gap of the second quantum well layer is larger than the band gap of the first quantum well layer. Current is flowed through the multi quantum well layer from a pair of electrodes. A first optical system input inputting a signal light wave to the multi quantum well layer via an input plane of the multi quantum well layer. A second optical system propagates an output light wave output from an output plane of the multi quantum well layer. A wavelength converting device is provided which can suppress the conversion efficiency from being lowered at a large detuning angular and obtain a relatively high conversion efficiency even at a negative detuning angular frequency.

14 Claims, 6 Drawing Sheets

WAVELENGTH CONVERTING DEVICE AND CONVERTING METHOD

This application is based on Japanese Patent Application 2000-84762, filed on Mar. 24, 2000, the entire contents of which are incorporated herein by reference.

BACKGROUND OF THE INVENTION a) Field of the Invention

The present invention relates to a wavelength converting device, and more particularly to a wavelength converting device for converting a wavelength by utilizing four-wave mixing. A wavelength converting device is used, for example, in wavelength multiplexing optical communications. Since light waves before and after wavelength conversion have a phase conjugation relation, a wavelength converting device is used for compensating for refractive index dispersion of an optical fiber uses for long distance optical transmission.

b) Description of the Related Art

When a pump wave having an angular frequency of $\omega_p$ and a signal light wave having an angular frequency of $\omega_s$ are input to an active layer whose carrier distribution is in an inversion state, a light wave having an angular frequency of $(2\omega_p - \omega_s)$ is output because of non-degenerate four-wave mixing. It has been proposed to utilize this phenomenon for wavelength conversion from a light wave of an angular frequency of $\omega_s$ into a light wave of an angular frequency of $(2\omega_p - \omega_s)$.

Semiconductor laser devices and semiconductor optical amplifier devices generally use bulk semiconductors and multi quantum well structures. In wavelength conversion in an active layer of these semiconductor devices through non-degenerate four-wave mixing, as a detuning angular frequency $(\omega_p - \omega_s)$ becomes large, a conversion efficiency lowers. If the detuning angular frequency is negative, the conversion efficiency is low.

SUMMARY OF THE INVENTION

It is an object of the present invention to provide a wavelength converting device and a wavelength converting method capable of suppressing the conversion efficiency from being lowered at a large detuning angular and obtaining a relatively high conversion efficiency even at a negative detuning angular frequency.

According to one aspect of the present invention, there is provided a wavelength converting device, comprising: a multi quantum well layer having input and output planes and a lamination of first and second quantum well layers each sandwiched between barrier layers and defining a quantum well, a band gap of the second quantum well layer being larger than a band gap of the first quantum well layer; a pair of electrodes to be used for flowing current through the multi quantum well layer along a thickness direction thereof; a first optical system for inputting a signal light wave to the multi quantum well layer via the input plane of the multi quantum well layer; and a second optical system for propagating an output light wave output from the output plane of the multi quantum well layer.

As current is flowed through the multi quantum well layer, the multi quantum well layer may enter the state that the first quantum well layer functions as a gain region and the second quantum well layer functions as an absorption layer, respectively relative to the light having a certain wavelength. The third order non-linear susceptibility by the carrier density pulsation effect in the gain region is proportional to a product of a gain and a differential refractive index. The third order non-linear susceptibility by the carrier density pulsation effect in an absorption region is proportional to a product of an absorption and a differential refractive index, and its sign is opposite to the sign of the third order non-linear susceptibility in the gain region. The third order non-linear susceptibility in a multi gain region is a sum of the third order non-linear susceptibilities in both the regions. If the values of the third order non-linear susceptibilities in both the regions are set to have values nearer to each other, the third order non-linear susceptibility by the carrier density pulsation effect can be made small. The third order non-linear susceptibility by the spectral hole burning effect is proportional to a difference between the gain and absorption, and does not depend on the differential refractive index. Accordingly, even if the third order non-linear susceptibility by the carrier density pulsation effect is made small, the third order non-linear susceptibility by the spectral hole burning effect can be maintained large. Since the third order non-linear susceptibility by the spectral hole burning effect is less dependent to the detuning angular frequency, the detuning angular frequency dependency of the wavelength conversion efficiency can be reduced.

According to another aspect of the present invention, there is provided a wavelength converting device, comprising: a multi quantum well layer having input and output planes and a lamination of first and second quantum well layers each sandwiched between barrier layers and defining a quantum well, a band gap of the second quantum well layer being larger than a band gap of the first quantum well layer; and a power source for flowing current through the multi quantum well layer in a thickness direction thereof so that a quasi Fermi level difference in the multi quantum well layer becomes larger than the band gap of the first quantum well layer and smaller than the band gap of the second quantum well layer.

An inversion distribution state of carrier densities occurs in the first quantum well layer. The inversion distribution state does not occur in the second quantum well layer. In this case, the first quantum well layer functions as the gain region and the second quantum well layer functions as the absorption layer, respectively relative to the light having a certain wavelength. Therefore, the third order non-linear susceptibility can be controlled in the manner described above.

According to another aspect of the present invention, there is provided a wavelength converting device, comprising: a multi quantum well layer having input and output planes and a lamination of first and second quantum well layers each sandwiched between barrier layers and defining a quantum well, a band gap of the second quantum well layer being larger than a band gap of the first quantum well layer, the second quantum well layer containing compressive strain and the first quantum well layer not containing strain; and a pair of electrodes to be used for flowing current through the multi quantum well layer in a thickness direction thereof.

The quantum well layer having compressive strain has a differential refractive index larger than that of the quantum well layer having no strain. Therefore, under the conditions that the third order non-linear susceptibility of the multi quantum well layer by the carrier density pulsation effect is constant, it becomes possible to raise the gain of the first quantum well layer and lower the absorption of the second quantum well layer. The third order non-linear susceptibility by the spectral hole burning effect can therefore be made large.

According to another aspect of the present invention, there is provided a wavelength converting method comprising the steps of: preparing a wavelength converting device having a multi quantum well layer having input and output planes and a lamination of first and second quantum well layers each sandwiched between barrier layers and defining a quantum well, a band gap of the second quantum well layer being larger than a band gap of the first quantum well layer; flowing current through the multi quantum well layer so that a quasi Fermi level difference in the multi quantum well layer becomes larger than the band gap of the first quantum well layer and smaller than the band gap of the second quantum well layer; inputting a signal light wave to the quantum well layer via the input plane; inputting a pump wave to or generating a pump wave in the multi quantum well layer, the pump wave having such a wavelength that the pump wave is amplified in the first quantum well layer and attenuated in the second quantum well layer; and picking up a wavelength converted output light wave from the output plane of the multi quantum well layer.

As the current having the above-described magnitude is flowed through the multi quantum well layer, the third order non-linear susceptibility by the spectral hole burning effect can be made large as described above. The detuning angular frequency dependency of the wavelength conversion efficiency can therefore be made small.

As described above, the detuning angular frequency dependency of the third order non-linear susceptibility of a multi quantum layer can be made small by using quantum well layers having different band gaps. It is therefore possible to reduce the wavelength dependency of the efficiency of wavelength conversion using non-degenerate four-wave mixing.

DETAILED DESCRIPTION OF THE PREFERRED EMBODIMENTS

Prior to describing the embodiments of the invention, a conversion efficiency of wavelength conversion through non-regeneration four-wave mixing in a conventional semiconductor active layer will be described. The conversion efficiency of wavelength conversion in a conventional semiconductor active layer changes with the detuning angular frequency, because the third order non-linear susceptibility of the active layer changes with the detuning angular frequency. This third order non-linear phenomenon results from a carrier density pulsation effect having a relatively slow response speed and a spectral hole burning effect having a relatively fast response speed. If the detuning angular frequency is positive, a sum of both the effects determines the third order non-linear susceptibility of the active layer, whereas if the detuning angular frequency is negative, a difference between both the effects determines the third order non-linear susceptibility of the active layer.

Figure 5:
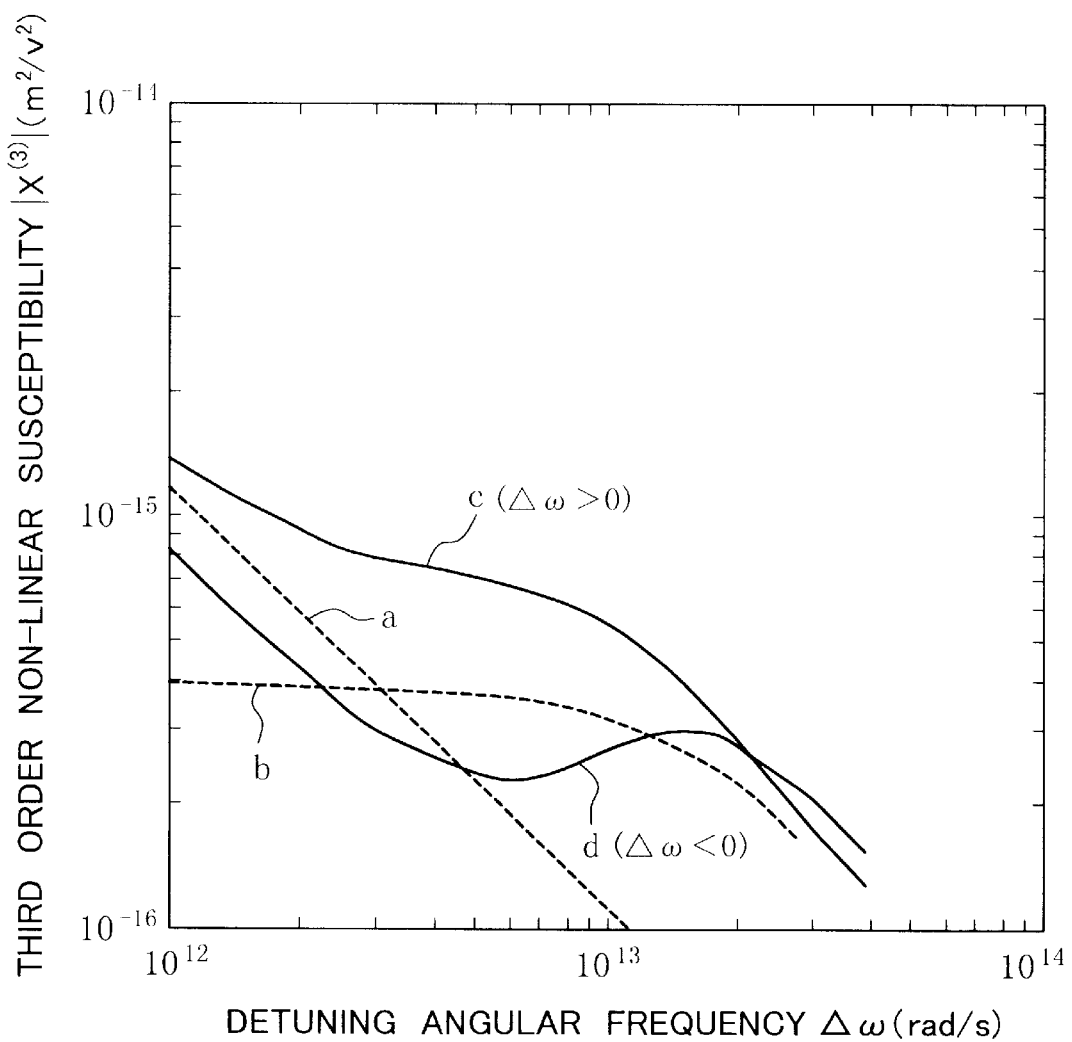
FIG. 5 is a graph showing a dependency of a detuning angular frequency upon a third order non-linear susceptibility of a conventional semiconductor active layer.

FIG. 5 is a graph showing a relation between a third order no-linear susceptibility and a detuning angular frequency. The abscissa represents a detuning angular frequency $\Delta\omega$ in the unit of "rad/s", and the ordinate represents a third order non-linear susceptibility $|X^{(3)}|$ in the unit of "$m^2N^{2}$". A broken line a in FIG. 5 indicates the third order non-linear susceptibility by the carrier density pulsation effect, and a broken line b indicates the third order non-linear susceptibility by the spectral hole burning effects. Since the carrier density pulsation effect has a slow response speed, as the detuning angular frequency becomes large, the third order non-linear susceptibility by the carrier density effect abruptly lowers. In contrast, since the spectral hole burning effect has a fast response speed, even if the detuning angular frequency becomes large, a reduction amount of the third order non-linear susceptibility by the spectral hole burning effect is small.

Solid lines c and d in FIG. 5 indicate the third order non-linear susceptibilities respectively at the positive and negative detuning angular frequencies $\Delta\omega$. The third order non-linear susceptibility at the positive detuning angular frequency $\Delta\omega$ is a sum of the third order non-linear susceptibilities by both the carrier density effect and spectral hole burning effect, whereas the third order non-linear susceptibility at the negative detuning angular frequency $\Delta\omega$ is a difference between of the third order non-linear susceptibilities by both the effects. Since the third order non-linear susceptibility takes a complex number, this susceptibility in the active layer does not take a simple sum or difference of real numbers.

As seen in FIG. 5, the third order non-linear susceptibilities in the conventional active layer are considerably different at the positive and negative detuning angular frequencies $\Delta\omega$. In addition, as the detuning angular frequency $\Delta\omega$ becomes large, the third order non-linear susceptibility lowers. In the wavelength converting devices of the embodiments described hereinafter, the third order non-linear susceptibility of a multi quantum well structure is less dependent upon the detuning angular frequency.

Next, with reference to FIGS. 1 and 2, a multi quantum well structure according to an embodiment of the invention will be described.

Figure 1:
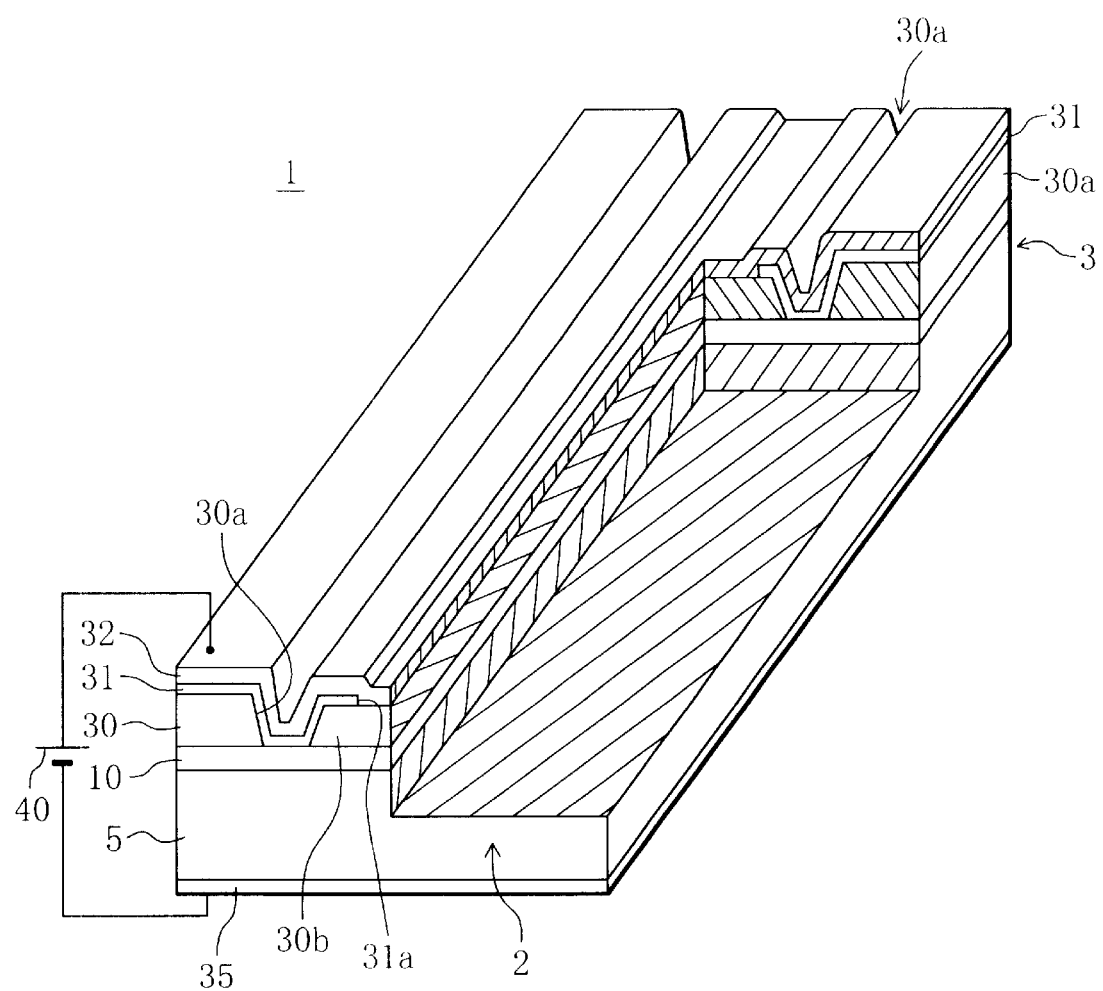
FIG. 1 is a perspective view partially broken of a wavelength converting device according to an embodiment of the invention.

FIG. 1 is a perspective view partially broken of a wavelength converting device of the embodiment. An active layer 10 is formed on the principal surface of an n-type InP substrate 5. An n-type impurity concentration of the n-type InP substrate 5 is, for example, $1\times10^{18}$ cm$^{-3}$. The detailed structure of the active layer 10 will be later described with reference to FIG. 2.

On the surface of the active layer 10, a p-type InP layer 30 is formed. For example, an impurity concentration of the p-type InP layer 30 is $1\times10^{18}$ cm$^{-3}$ and its thickness is 1000 nm. Two parallel grooves 30a, which define a ridge therebetween, are formed in the p-type InP layer 30. This groove 30a extends to the upper surface of the active layer 10. A region 30b between the two grooves functions as a clad.

The surface of the p-type InP layer 30 and the inner surfaces of the grooves 30 are covered with a protective film 31 of SiO$_2$ having a thickness of 200 nm. An opening 31a is formed through the protective film 31 to expose a partial upper surface of the p-type InP clad 30b. The opening 31a is long along the longitudinal direction of the p-type InP clad 30b.

A p-side electrode 32 is formed on the protective film 31 and on the bottom of the opening 31a. The p-side electrode 32 has a three-layer structure of a 100 nm thick Ti layer, a 200 nm thick Pt layer and a 5000 nm thick Au layer stacked in this order from the substrate side. The p-side electrode 32 is in ohmic contact with the p-type InP clad 30b on the bottom of the opening 31a. An n-side electrode 35 is formed on the bottom of the n-type InP substrate 5. The n-side electrode 35 has a two-layer structure of a 30 nm thick AuGe alloy layer and a 120 nm thick Au layer stacked in this order from the substrate side. The n-side electrode 35 is in ohmic contact with the n-type InP substrate 5.

A length of the wavelength converting device (a length along the longitudinal direction of the p-type InP clad 30b) is about 1 mm. One side surface of the wavelength converting device 1 is an input plane 2 for a signal light wave and a pump wave, and another side surface is an output plane 3 for an output light wave. A power source 40 applies a forward d.c. voltage across the p-side electrode 32 and n-side electrode 35.

Figure 2:
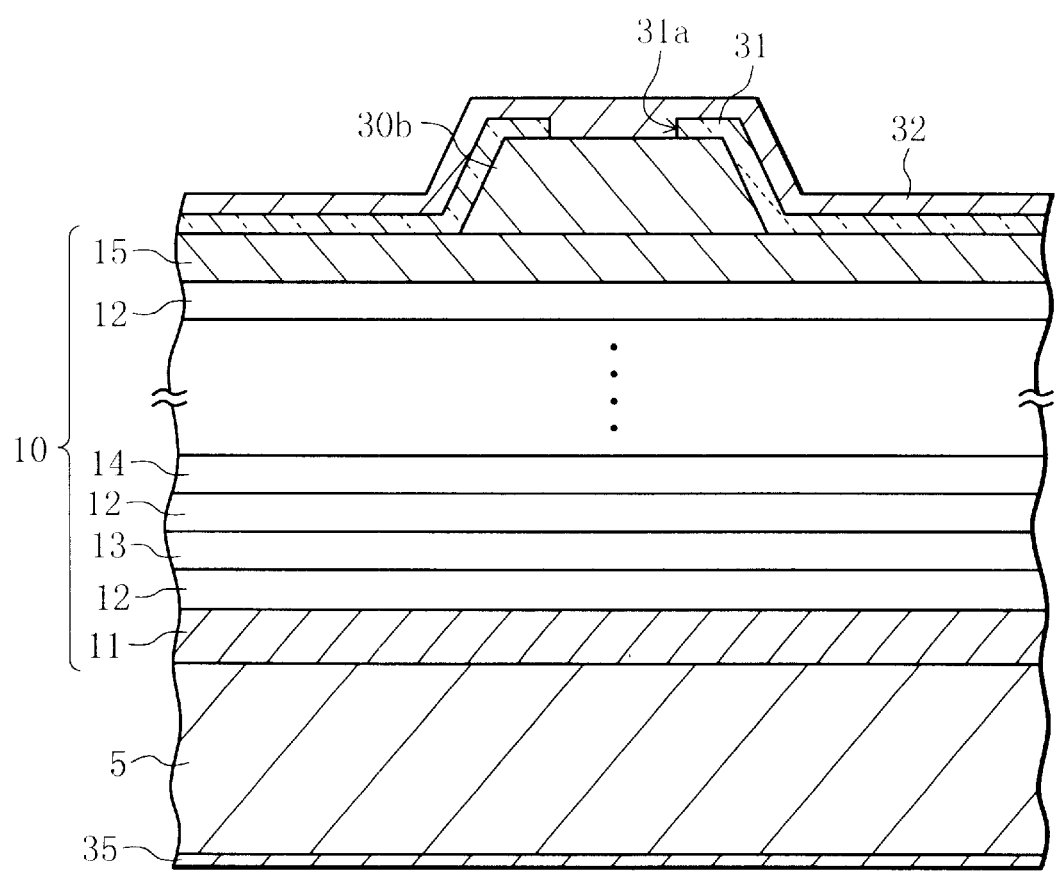
FIG. 2 is a cross sectional view of the wavelength converting device shown in FIG. 1.

FIG. 2 is a cross sectional view of the wavelength converting device shown in FIG. 1. The active layer 10 is formed on the principal surface of the p-type InP substrate 5. The structure of the active layer 10 will be described hereinafter.

At the level nearest to the substrate, a confinement layer 11 of n-type InGaAsP having a thickness of 100 nm is disposed. The composition ratio of the confinement layer 11 corresponds to a photoluminescence wavelength (PL wavelength) of 1.1 µm and an impurity concentration of this layer is 5×10$^{17}$ cm$^{-3}$. On this confinement layer 11, a barrier layer 12, a wide band gap well layer 13, a barrier layer 12 and a narrow band gap well layer 14 are disposed. Over these layers, barrier layers 12 and narrow band gap well layers 14 are alternately disposed. The total number of narrow band gap well layers 14 is five. On the highest level narrow band gap well layer 14, a barrier layer 12 is formed. On this highest level barrier layer 12, a confinement layer 15 of p-type InGaAsP having a thickness of 100 nm is disposed. The composition ratio of the confinement layer 15 corresponds to a PL wavelength of 1.1 µm and an impurity concentration of this layer is 5×10$^{17}$ cm$^{-3}$.

The barrier layers 12, wide band gap well layers 13 and narrow band gap well layers 14 are all made of undoped InGaAsP. Each barrier layer 12 has a thickness of 10 nm and its composition ratio corresponds to a PL wavelength of 1.2 µm. Each wide band gap well layer 13 has a thickness of 5.1 nm and its composition ratio corresponds to a PL wavelength of 1.564 µm. Each narrow band gap well layer 14 has a thickness of 6.5 nm and its composition ratio corresponds to a PL wavelength of 1.577 µm. With these composition ratios, the narrow band gap well layer 14 has no strain and the wide band gap well layer 13 contains 0.8% compressive strain.

A method of manufacturing the wavelength converting device shown in FIGS. 1 and 2 will be described. Each layer in the active layer 10 and the p-type InP layer 30 are formed by metal organic chemical vapor deposition (MOCVD). The grooves 30 are formed by reactive ion etching (RIE) using CF$_4$. The input plane 2 and output plane 3 are formed through cleavage.

Next, with reference to FIGS. 3A and 3B, the operation principle of the wavelength converting device of the embodiment will be described.

Figure 3A:
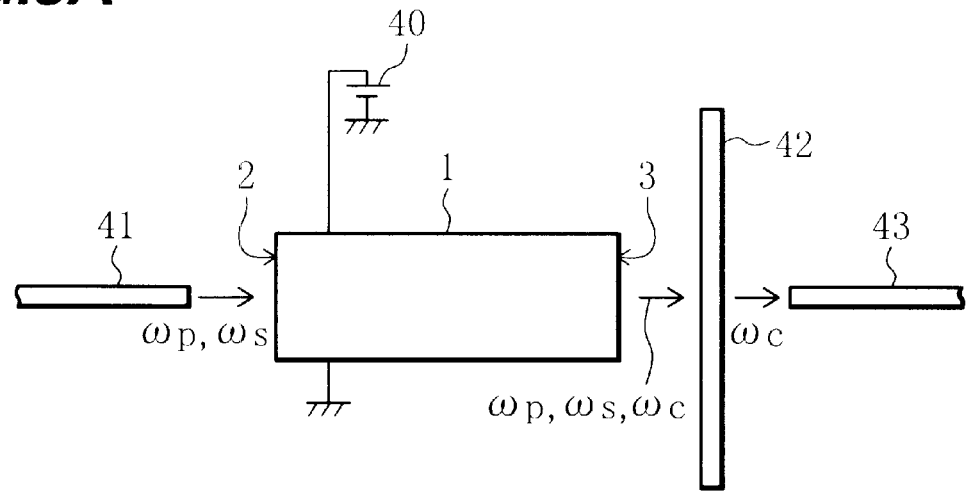
FIGS. 3A and 3B are a schematic diagram showing a wavelength converting optical system using the wavelength converting device of the embodiment, and an energy band diagram of an active layer, respectively.

As shown in FIG. 3A, a forward current of 100 mA is flowed from the power source 40 to the wavelength converting device 1. A signal light wave and a pump wave propagated in an optical fiber 41 become incident upon the input plane 2 of the wavelength converting device 1 and enter its active layer. A light wave is output from the output plane 3 by non-regeneration four-wave mixing. By representing the angular frequencies of the signal light wave, excitation light wave and output light wave by $\omega_s$, $\omega_p$ and $\omega_c$, the following equation is satisfied:

$$\omega_c = 2\omega_p - \omega_s \tag{1}$$

In addition to the output light wave, light waves having the same angular frequencies as those of the signal light wave and excitation light wave are also output from the output plane 3.

Light waves output from the output plane 3 enter a filter 42. This filter 42 intercepts light waves having the angular frequencies of $\omega_s$ and $\omega_p$ and transmits only the light wave having the angular frequency of $\omega_c$. An output light wave having the angular frequency of $\omega_c$ and transmitted through the filer 42 becomes incident upon an optical fiber 43. In this manner, the signal light wave having the angular frequency of $\omega_s$ can be converted into the output light wave having the angular frequency of $\omega_c$.

Figure 3B:
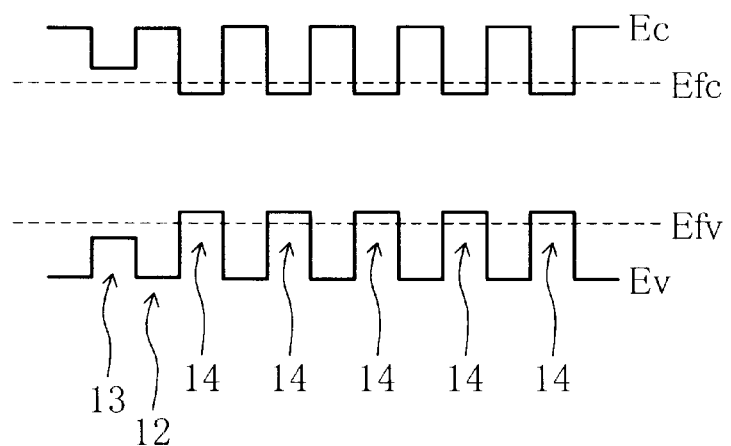

FIG. 3B is an energy band diagram of the active layer 10 of the wavelength converting device 1 shown in FIG. 2. A band gap of the wide band gap well layer 13 is larger than that of the narrow band gap well layer 14. While the forward current of 100 mA is flowed through the active layer 10, the quasi Fermi level $E_{fc}$ on the conduction band side positions between a level $E_c$ at the lower end of the conduction band of the wide band gap well layer 13 and a level $E_c$ at the lower end of the conduction band of the narrow band gap well layer 14. Also, the quasi Fermi level $E_{fv}$ on the valence band side positions between a level $E_v$ at the upper end of the valence band of the wide band gap well layer 13 and a level $E_v$ at the upper end of the valence band of the narrow band gap well layer 14. Namely, a difference ($E_{fc}-E_{fv}$) between quasi Fermi levels is smaller than the band gap $E_{GW}$ of the wide band gap well layer 13 and larger than the band gap $E_{GN}$ of the narrow band gap well layer 14. For example, the difference between quasi Fermi levels is about 0.93 eV at the forward current of 100 mA.

When a pump wave of 1550 nm in wavelength and a signal light wave of 1570 nm in wavelength are input to the input plane 2 under a forward current of 100 mA, an output light wave of 1530 nm in wavelength is output from the output plane 3. Conversely, if the wavelength of the signal light wave is 1530, the wavelength of the output light wave is 1570 nm.

There is inversion distribution of carriers in the narrow band gap well layer 14 so that a pump wave propagating in the active layer is amplified. Conversely, the pump wave is absorbed in the wide band gap well layer 13 and carriers are excited. The third order non-linear susceptibility by the carrier density pulsation effect in a gain region (in this embodiment, in the narrow band gap well layer 14) is proportional to a product of a differential refractive index and a gain g. The third order non-linear susceptibility by the carrier density pulsation effect in an absorption region (in this embodiment, in the wide band gap well layer 13) is proportional to a product of a differential refractive index and an absorption coefficient α, and its sign is opposite to the sign of the third order non-linear susceptibility in the gain region. A differential refractive index is given by dη/dN where η is a refractive index and N is a carrier density.

The third order non-linear susceptibility $|X^{(3)}{}_{CDP}|$ by the carrier density pulsation effect in the active layer satisfies the following formula:

$$|X^{(3)}{}_{CDP}| \; g(d\eta/dN)_n - \alpha(d\eta/dN)_W \quad (2)$$

where $(d\eta/dN)_W$ is a differential refractive index of the wide band gap well layer 13 and $(d\eta/dN)_N$ is a differential refractive index of the narrow band gap well layer 14. As understood from the formula (2), if the indices $g(d\eta/dN)_N$ and $\alpha(d\eta/dN)_W$ are set to have values nearer to each other, the third order non-linear susceptibility $|X^{(3)}{}_{CDP}|$ by the carrier density pulsation effect becomes small.

The third order non-linear susceptibility $|X^{(3)}{}_{SHB}|$ by the spectral hole burning effect is proportional to a difference between a gain in the gain region and an absorption in the absorption region. Namely, the following formula is satisfied:

$$|X^{(3)}{}_{SHB}| \; g-\alpha \quad (3)$$

Generally, a differential refractive index is large in the absorption region and small in the gain region. The following formula is therefore satisfied:

$$(d\eta/dN)_W > (d\eta/dN)_N \quad (4)$$

It can be understood from the formulas (2) and (4) that the third order non-linear susceptibility $|X^{(3)}{}_{CDP}|$ by the carrier density pulsation effect becomes small by designing the active layer so as to satisfy the following formula:

$$g > \alpha \quad (5)$$

depending upon a difference between $(d\eta/dN)_N$ and $(d\eta/dN)_W$. In this case, as seen from the formula (3), the third order non-linear susceptibility $|X^{(3)}{}_{SHB}|$ by the spectral hole burning effect is not influenced by the differential refractive index, so that this susceptibility maintains a relatively large value.

For example, in order to satisfy the formula (5), it is sufficient if the following formula is satisfied:

$$E_{GW} - (E_{fc} - E_{fv}) < E_{GN} - (E_{fc} - E_{fv})$$

The band gap $E_{GW}$ of the wide band gap well layer 13 and the band gap $E_{GN}$ of the narrow band gap well layer 14 can be set to proper values by changing the composition ratios of materials of these well layers 13 and 14. The quasi Fermi level difference $(E_{fc} - E_{fv})$ can be adjusted by changing the magnitude of a forward current.

In the wavelength converting device of this embodiment, the wide band gap well layer 13 contains compressive strain and the narrow band gap well layer 14 has no strain. It is known that a differential refractive index of a quantum well layer having compressive strain is larger than that of a quantum well layer having no strain. In this embodiment, therefore, the conditions of the formula (4) can be satisfied more easily.

In order to make the value of the right side of the formula (2) smaller under the conditions that the differential refractive index $(d\eta/dN)_W$ of the wide band gap well layer 13 is set larger and the differential refractive index $(d\eta/dN)_N$ of the narrow band gap well layer 14 is set smaller, it is sufficient if the gain g is set larger and the absorption coefficient α is set smaller. In this case, since the difference between the gain g and absorption coefficient α becomes large, the third order non-linear susceptibility $|X^{(3)}{}_{SHB}|$ by the spectral hole burning effect can be made larger as understood from the formula (3).

In this embodiment, the third order non-linear susceptibility $|X^{(3)}{}_{CDP}|$ by the carrier density pulsation effect becomes small whereas the third order non-linear susceptibility $|X^{(3)}{}_{SHB}|$ by the spectral hole burning effect becomes large. Accordingly, the spectral hole burning effect becomes dominant in the active layer and the carrier density pulsation effect influences less.

Namely, the third order non-linear susceptibility by the spectral hole burning effect indicated by the broken line b in FIG. 5 becomes dominant. Therefore, the third order non-linear susceptibility of the active layer is less susceptible to the influence of a change in the detuning angular frequency Δω. In addition, a difference between the third order non-linear susceptibilities at the positive and negative detuning angular frequencies Δω becomes small. It is therefore possible to reduce a variation width of the wavelength conversion efficiency of a signal light wave having an angular frequency in some range near the angular frequency $\omega_p$ of a pump wave.

Figure 6:
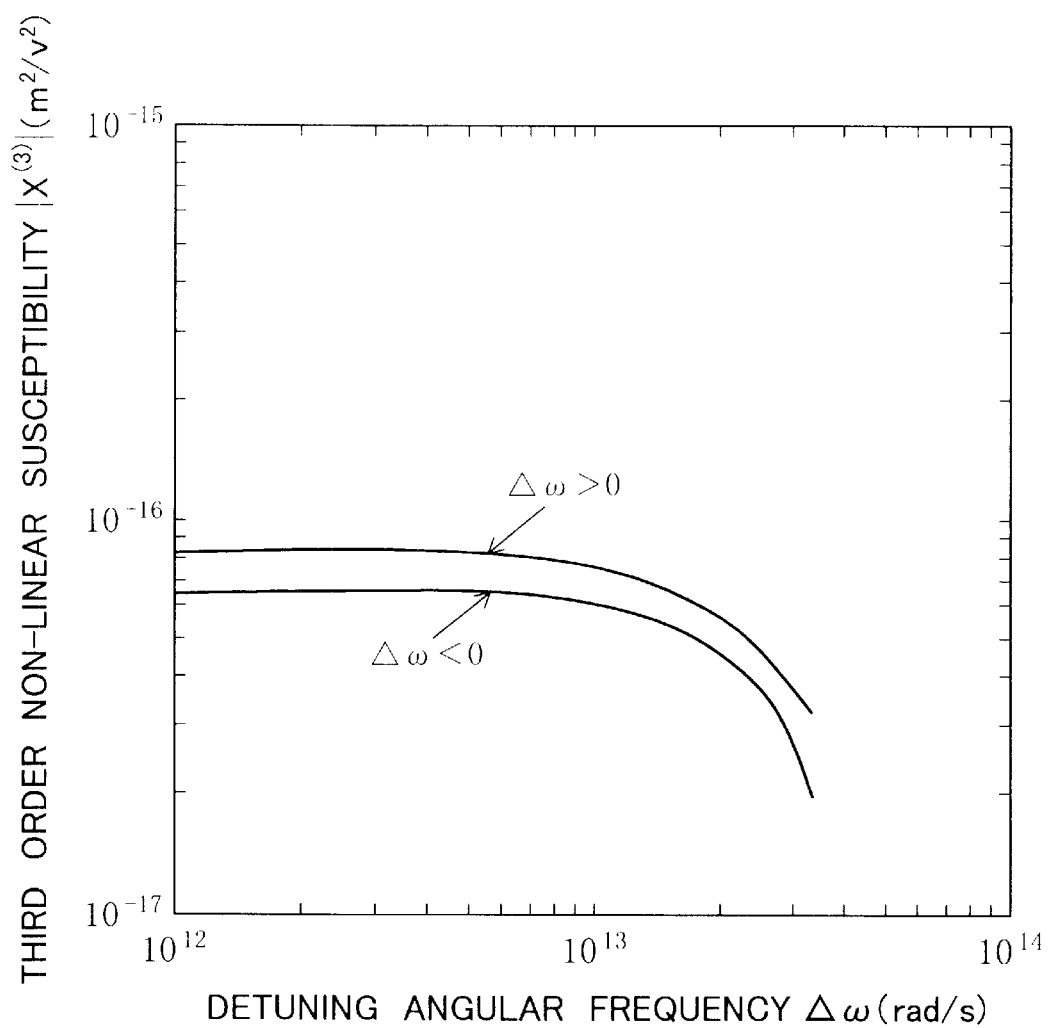
FIG. 6 is a graph showing a dependency of a detuning angular frequency upon a third order non-linear susceptibility of a wavelength converting device according to an embodiment of the invention.

FIG. 6 is a graph showing a detuning angular frequency dependency of the third order non-linear susceptibility of an active layer including wide and narrow band gap well layers. The number of wide band well layers is three, the carrier concentration is $3.1 \times 10^{18}$ cm$^{-3}$, a thickness is 5 nm, a band gap is 0.8467 eV, and a compressive strain amount is 0.8%. The number of narrow band well layers is one, the carrier concentration is $2.4 \times 10^{18}$ cm$^{-3}$, a thickness is 5 nm, a band gap is 0.8300 eV, and a compressive strain amount is 0.8%. The same compressive strain amount is used for both the wide and narrow band gap well layers. Such arrangement can be realized by using two types of semiconductor material having the same lattice constant and different band gaps.

As seen from FIG. 6, the detuning angular frequency dependency of the third order non-linear susceptibility is less than that shown in the graph of FIG. 5. Also, a difference between third order non-linear susceptibilities at positive and negative detuning angular frequencies is smaller.

In this embodiment, although both a signal light wave and a pump wave are input to the wavelength converting device, the pump wave may be generated in the wavelength converting device. Next, another embodiment of the wavelength converting device will be described which can generate a pump wave in the wavelength converting device itself.

Figure 4:
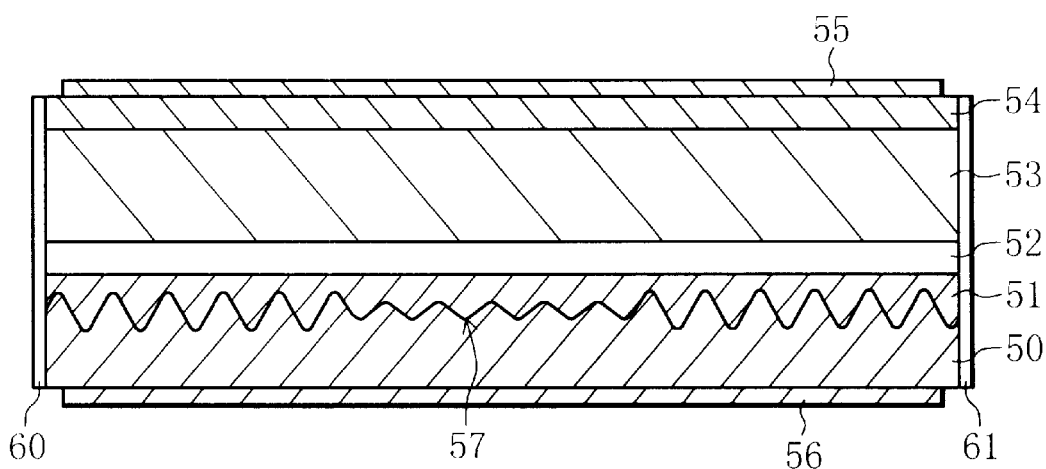
FIG. 4 is a cross sectional view of a wavelength converting device according to another embodiment of the invention.

FIG. 4 is a cross sectional view of a wavelength converting device according to another embodiment. The basic structure is the same as that of a general distributed feedback type semiconductor laser. On the surface of an n-type clad 50, a diffraction grating 57 made of a periodical concave and convex plane is formed. On this diffraction grating 57, a guide layer 51, an active layer 52, a p-type clad 53, and a contact layer 54 are formed. The active layer has the structure similar to that of the active layer 10 of the wavelength converting device of the first embodiment shown in FIG. 2.

An n-side electrode 56 electrically contacts the n-type clad 50, and a p-side electrode 55 electrically contacts the p-type clad 53. Opposite side surfaces are coated with low reflection films 60 and 61. Light generated in the DFB laser through laser oscillation functions as a pump wave for non-degenerate four-wave mixing. Therefore, only a signal light wave is input to one side surface. As the signal light wave is input, a wavelength converted light wave is output from the other side surface by non-degenerate four-wave mixing.

In a state that the laser oscillation continues, quasi Fermi levels in the active layer on the sides of conduction and valence bands are fixed. When a difference between these fixed quasi Fermi levels becomes smaller than the band gap of the wide band gap well layer and larger than the band gap of the narrow band gap well layer, the energy state shown in FIG. 3B can be realized.

The quasi Fermi level difference during laser oscillation is defined by the reflection loss of the diffraction grating and the gain and absorption in the active layer. It is therefore expected that the energy state shown in FIG. 3B can be realized if the reflection loss of the diffraction grating, the gain and absorption in the active layer, the band gap of the wide band gap well layer and the band gap of the narrow band gap well layer are properly set.

In the embodiment, although the active layer of an InGaAsP series of the wavelength converting device is grown on an InP substrate, other semiconductor materials may also be used.

The present invention has been described in connection with the preferred embodiments. The invention is not limited only to the above embodiments. It is apparent that various modifications, improvements, combinations, and the like can be made by those skilled in the art.

What we claim are:

1. A wavelength converting device, comprising:
   a multi quantum well layer having input and output planes and a lamination of first and second quantum well layers each sandwiched between barrier layers and defining a quantum well, a band gap of the second quantum well layer being larger than a band gap of the first quantum well layer;
   a pair of electrodes to be used for flowing current through said multi quantum well layer along a thickness direction thereof;
   a first optical system for inputting a signal light wave to said multi quantum well layer via the input plane of said multi quantum well layer; and
   a second optical system for propagating an output light wave output from the output plane of said multi quantum well layer.

2. A wavelength converting device according to claim 1, wherein the barrier layers and the first and second quantum well layers are made of InGaAsP.

3. A wavelength converting device according to claim 1, wherein the second quantum well layer contains compressive strain and the first quantum well layer does not contain strain.

4. A wavelength converting device according to claim 1, wherein the barrier layers (12) sandwiching the second quantum layer (13) consists of a same material as the barrier layers sandwiching the first quantum well layer (14).

5. A wavelength converting device according to claim 1, wherein the first quantum well layer consists of a plurality of well layers (14), which are divided by the barrier layer (12) therebetween, and the barrier layer sandwiched between the first quantum well layer and the second quantum well layer (13) consists of a same material as the barrier layers dividing the well layers (14) of the first quantum well layer.

6. A wavelength converting device, comprising:
   a multi quantum well layer having input and output planes and a lamination of first and second quantum well layers each sandwiched between barrier layers and defining a quantum well, a band gap of the second quantum well layer being larger than a band gap of the first quantum well layer; and
   a power source for flowing current through said multi quantum well layer in a thickness direction thereof so that a quasi Fermi level difference in said multi quantum well layer becomes larger than the band gap of the first quantum well layer and smaller than the band gap of the second quantum well layer.

7. A wavelength converting device according to claim 6, wherein the barrier layers and the first and second quantum well layers are made of InGaAsP.

8. A wavelength converting device according to claim 6, wherein the second quantum well layer contains compressive strain and the first quantum well layer does not contain strain.

9. A wavelength converting device according to claim 6, wherein said power source includes an adjustment for flowing the current through said multi quantum well layer so that a difference between a quasi Fermi level difference in the first quantum well layer and a band gap of the first quantum well layer becomes larger than a difference between a quasi Fermi level difference in the second quantum well layer and a band gap of the second quantum well layer.

10. A wavelength converting device, comprising:
    a multi quantum well layer having input and output planes and a lamination of first and second quantum well layers each sandwiched between barrier layers and defining a quantum well, a band gap of the second quantum well layer being larger than a band gap of the first quantum well layer, the second quantum well layer containing compressive strain and the first quantum well layer not containing strain; and
    a pair of electrodes to be used for flowing current through said multi quantum well layer in a thickness direction thereof.

11. A wavelength converting device according to claim 10, wherein the barrier layers and the first and second quantum well layers are made of InGaAsP.

12. A wavelength converting method comprising the steps of:
    preparing a wavelength converting device having a multi quantum well layer having input and output planes and a lamination of first and second quantum well layers each sandwiched between barrier layers and defining a quantum well, a band gap of the second quantum well layer being larger than a band gap of the first quantum well layer;
    flowing current through the multi quantum well layer so that a quasi Fermi level difference in the multi quantum well layer becomes larger than the band gap of the first quantum well layer and smaller than the band gap of the second quantum well layer;
    inputting a signal light wave to the multi quantum well layer via the input plane;
    inputting a pump wave to or generating a pump wave in the multi quantum well layer, the pump wave having such a wavelength that the pump wave is amplified in the first quantum well layer and attenuated in the second quantum well layer; and
    picking up a wavelength converted output light wave from the output plane of the multi quantum well layer.

13. A wavelength converting method according to claim 12, wherein the barrier layers and the first and second quantum well layers are made of InGaAsP.

14. A wavelength converting method according to claim 12, wherein the second quantum well layer contains compressive strain and the first quantum well layer does not contain strain.

* * * * *